United States Patent Office
3,096,341
Patented July 2, 1963

3,096,341
9-CYANOETHYL DODECAHYDROCARBAZOLE
Chester S. Sheppard, Pittsburgh, and Myron H. Wilt, Monroeville, Pa., assignors to United States Steel Corporation, a corporation of New Jersey
No Drawing. Filed Apr. 25, 1960, Ser. No. 24,263
1 Claim. (Cl. 260—315)

This invention relates to a group of compounds derived from the secondary amine, dodecahydrocarbazole.

Secondary amines are used extensively in industry for such applications as corrosion inhibitors, antioxidants, rubber additives, pickling inhibitors, germicides, insecticides and pharmaceuticals. Suitably substituted secondary amines are generally not readily available and require several operations for their production. Such amines are therefore relatively expensive. Cheap and readily available sources of suitable secondary amines that can be used for such commercial applications are continually being sought, and the commercially useful derivatives of such amines are highly desirable.

Secondary amines of sufficient molecular weight to be considered nonvolatile usually contain bulky substituents around the amine nitrogen. This tends to lower the activity of the amine nitrogen and also renders the amine and its derivatives too insoluble for many applications. Cyclic substituents have been resorted to in an effort to reduce these undesirable effects.

We have invented a group of compounds derived from dodecahydrocarbazole which are useful for the above purposes, as explained fully hereinafter. Our compounds may be easily prepared from the cheap readily available secondary amine, dodecahydrocarbazole in good yields. The specific compounds of our invention are:

I. Dodecahydrocarbazolium 2-benzothiazolemercaptide,

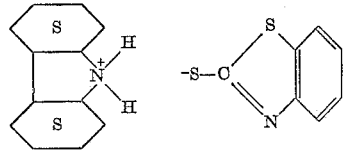

II. 9-cyanoethyldodecahydrocarbazole,

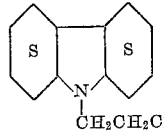

III. 9-(γ-aminopropyl)-dodecahydrocarbazole,

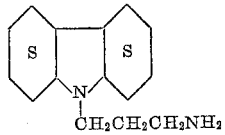

IV. Dodecahydrocarbazolium nitrite,

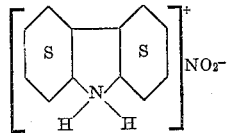

V. N-methyl-N-(β-cyanoethyl)dodecahydrocarbazolium iodide,

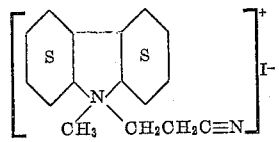

The claim hereof is directed to II.
As secondary products, N,N-(2,2'-bicyclohexylene)-2-benzothiazosulfenamide:

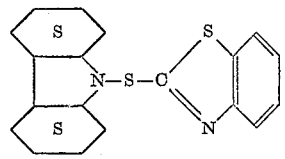

results from oxidation of I; and N-nitrosododecahydrocarbazole,

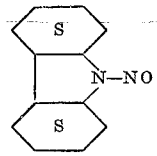

from dehydration of IV.

These derivatives have the advantage that the secondary amine from which they are derived, viz., dodecahydrocarbazole, is particularly well adapted for preparing such useful materials. It is of sufficient molecular weight to be nonvolatile, and it is readily and symmetrically substituted by two linked cyclohexyl groups which tend to eliminate any steric effects from hindering the activity of the amine nitrogen and lowering the solubility of the amine derivatives. These derivatives also have the advantage that they are derived from a readily available and low-cost source of secondary amine material, viz., the coal-tar chemical, carbazole. This compound, a byproduct of coal tar, is readily converted to dodecahydrocarbazole in one simple hydrogenation operation.

A complete understanding of the invention may be obtained from the following detailed explanation of a typical example thereof.

*Example*

To a stirred suspension of 40.3 grams of dodecahydrocarbazole in 125 ml. of acrylonitrile in an ice bath was added 1 ml. of a 38% aqueous solution of trimethylbenzylammonium hydroxide. After the reaction subsided, the mixture was heated to reflux on a steam bath for 3.5 hours with stirring and cooled. The excess acrylonitrile was removed by distillation under vacuum. The residue was treated with hot petroleum ether and filtered to remove the insoluble acrylonitrile polymer. The petroleum ether was removed by distillation to give as the product 9-cyanoethyldodecahydrocarbazole (II) (47.3 grams; 91% yield), which was purified by a vacuum distillation. Its infrared spectrum is in accord with its structure, showing the disappearance of the N—H band of dodecahydrocarbazole at 2.9 microns and the appearance of the —C≡N band at 4.4 microns.

The reaction is shown in the following chemical equation:

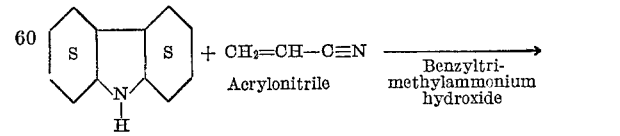

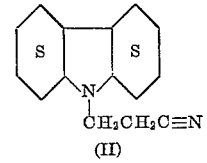

9-cyanoethyldodecahydrocarbazole (II) was shown by the following procedure to be useful as acid-pickling inhibitors:

One-inch square, 22 gauge, freshly polished pieces of cold-rolled steel, after weighing, were suspended from Nichrome wire in aqueous hydrochloric acid (10 weight percent) containing one weight percent (based on the weight of acid) of the test compound. The solutions, with the metal, were heated at 70° C. for 1½ hours. The metal samples were washed in ethanol, benzene, and petroleum ether; air dried; and weighed. The weight losses, the diminution of which was taken as the criterion of inhibitory action of the respective compounds tested, are given below:

| Compound tested: | Percent weight Loss of metal |
|---|---|
| No inhibitor added to pickling bath | 14.6 |
| 9-cyanoethyldodecahydrocarbazole | 0.7 |

This shows clearly that the above compound was an active pickling inhibitor.

Solutions containing one percent of compounds II and III and a saturated solution of compound I containing about 0.5% thereof in linseed oil were prepared and allowed to stand in open crystallizing dishes for 48 hours and compared to linseed oil without an antioxidant allowed to stand for a similar period. Oxidation of linseed oil is accompanied by an increase in weight due to oxygen uptake. A measure of the gain or loss of weight of the linseed oil solutions gives an indication of the antioxidant properties of the test compounds. The data obtained from this test are shown in the following table:

| Compound tested: | Weight gain or loss mg./4.0 g. of linseed oil |
|---|---|
| (1) Boiled linseed oil; no antioxidant | +136.6 |
| (2) Dodecahydrocarbazolium 2 - benzothiazolemercaptide, I | +19.6 |
| (3) 9-cyanoethyldodecahdrocarbazole, II | +5.6 |
| (4) 9-(γ - aminopropyl)dodecahydrocarbazole, III | —3.0 |

These data show that all the compounds tested had activity as antioxidants for linseed oil.

These oxidation-inhibiting compounds are added to the oil or hydrocarbon fraction to be inhibited in amounts of from 0.1 to about 5.0% by weight. The preferred range is about 1% by weight or a saturated solution of the inhibitor if its solubility in the oil or hydrocarbon fraction is less than 1% by weight. The resultant inhibited oil or hydrocarbon fraction can be stored without oxidative deterioration taking place.

9-cyanoethyldodecahydrocarbazole (II) can be considered as an intermediate for many other potentially useful products. Hydrolysis of the nitrile group will readily give the corresponding carboxylic acid, VIII, its esters, IX, or its amides, X. Treatment with alkyl halides will readily convert II to the corresponding quaternary salt, XI.

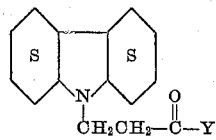

(VIII) Y=OH
(IX) Y=OR where R=any alkyl radical
(X) Y=NR'R" where R' and R" can be hydrogen or any alkyl radicals

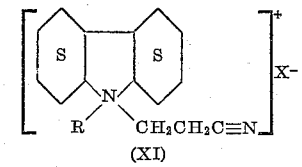

where R=any alkyl radical, $C_nH_{2n-1}$, and X=chlorine, bromine or iodine

It will be apparent that our invention provides useful secondary-amine derivatives which can be easily prepared from a cheap, readily available starting compound.

Although we have disclosed herein the preferred practice of our invention, we intend to cover as well any change or modification therein which may be made without departing from the spirit and scope of the invention.

We claim:

The compound 9-(β-cyanoethyl-)dodecahydrocarbazole.

References Cited in the file of this patent
UNITED STATES PATENTS

| 2,037,762 | Cole | Apr. 21, 1936 |
| 2,662,905 | Schwab | Dec. 15, 1953 |
| 3,014,920 | Dressler et al. | Dec. 26, 1961 |

OTHER REFERENCES

Adams et al., Organic Reactions, volume 5, pages 86, 119 (1949).